(12) United States Patent
Ochoa (10) Patent No.: US 7,407,439 B1
(45) Date of Patent: Aug. 5, 2008

(54) APPARATUS AND SYSTEM FOR RECONFIGURABLE TWO-HAND GAME CONTROLLERS

(76) Inventor: Justin J. Ochoa, 1903 Belleamah Dr., Alamagordo, NM (US) 88310

( * ) Notice: Subject to any disclaimer, the term of this patent is extended or adjusted under 35 U.S.C. 154(b) by 399 days.

(21) Appl. No.: 11/025,098

(22) Filed: Dec. 29, 2004

(51) Int. Cl.
A63F 13/00 (2006.01)

(52) U.S. Cl. .............................. 463/37; 463/38; 345/161

(58) Field of Classification Search ............... 463/37, 463/38; 345/156, 161, 163
See application file for complete search history.

(56) References Cited

U.S. PATENT DOCUMENTS

| | | | |
|---|---|---|---|
| 5,661,505 A | | 8/1997 | Livits |
| 5,786,807 A | | 7/1998 | Couch |
| 5,919,092 A | * | 7/1999 | Yokoi et al. ...................... 463/37 |
| 5,970,900 A | * | 10/1999 | Sheldon et al. ............. 114/253 |
| 5,982,356 A | | 11/1999 | Akiyama |
| 6,068,554 A | | 5/2000 | Tyler |
| 6,148,593 A | | 11/2000 | Heinsey |
| 6,251,015 B1 | * | 6/2001 | Caprai ......................... 463/36 |
| 6,325,719 B1 | * | 12/2001 | Fukawa et al. ................. 463/37 |
| D457,884 S | | 5/2002 | Roberts |
| 6,461,242 B2 | * | 10/2002 | Takeda et al. .................. 463/38 |
| 6,480,184 B1 | | 11/2002 | Price |
| 6,512,511 B2 | | 1/2003 | Willner |
| 6,603,459 B2 | | 8/2003 | Matsufusa |
| 6,650,254 B1 | | 11/2003 | Rix |
| 6,659,870 B2 | * | 12/2003 | Sobota ......................... 463/37 |
| 6,752,719 B2 | * | 6/2004 | Himoto et al. ................. 463/37 |
| 2005/0130739 A1 | * | 6/2005 | Argentar ....................... 463/36 |

* cited by examiner

Primary Examiner—John M. Hotaling, II
Assistant Examiner—Jeffrey K Wong
(74) Attorney, Agent, or Firm—Howard Cohen (57) ABSTRACT

A game controller system for electronic games includes a two-hand operated game pad that has a pair of pistol-like grips extending from opposed ends of a central housing bearing player input buttons, triggers analog sticks, and digital pad. A wrist support panel extends laterally from the bottom of each grip to provide a rest for the blade portion of the gripping hand. A plug connector disposed on the housing releasably connects to any one of several modules, such as mouse, joystick, and steering units to enable a user to reconfigure the assembly for different games and purposes.

4 Claims, 5 Drawing Sheets

APPARATUS AND SYSTEM FOR RECONFIGURABLE TWO-HAND GAME CONTROLLERS

CROSS-REFERENCE TO RELATED APPLICATIONS

None

FEDERALLY SPONSORED RESEARCH

Not applicable.

SEQUENCE LISTING, ETC ON CD

Not applicable.

BACKGROUND OF THE INVENTION

1. Field of the Invention

The present invention generally relates to methods and apparatus for peripheral input devices designed for computers and video game consoles.

2. Description of Related Art

There are a large variety of peripheral computer and game console input devices. They range from typical mouse/keyboard setups to hand held game pads, joysticks, d-pads, and track ball devices, along with a number of other such devices.

With the emergence of computer and console video games, however, there are a number of inherent limitation in regard to the video game controllers themselves and their related input components. These limitations range from functionality and adaptability, to general ergonomics. For instance, a typical flight controller yoke, which generally comprises a hand operated joystick with a plurality of analog and/or digital buttons, functions well in a video gaming environment that require slow steady directional changes or similar aiming functions. By nature of its construction the base element of the flight yoke sits atop a fixed working surface. This provides an optimum leverage point. What is more the hand operated joystick component of the device requires the participation of the entire limb of the user for manipulation during operation within the gaming environment. The accompanying electronics further dampen the degree of sensitivity so as not to produce extreme or erratic motion. This makes for a very precise method of operation in its particular field of application within the video gaming environment. This device, however, by nature of its construction cannot provide quick reflex aiming such as that which is possible with a mouse input device, and therefore is limited to slower steadier applications.

The computer mouse and keyboard combination, on the other hand, provides excellent quick reflex aiming. This is due to the inherent nature of the method of operation associated with the computer mouse. By gliding over a fixed surface and using the entire limb of the user to manipulate it within the video gaming environment the computer mouse makes for a very precise method of operation. There is no separation between the motion of the user's hand and the corresponding movement of the cursor or pointing reticle within the gaming environment. The accompanying electronics further allow for a higher degree of sensitivity which results in very quick reflex aiming ability. It is noteworthy to mention that the keyboard is generally a poor choice as a video gaming input device because it lacks the quick reflex, finger tip functionality such as that found on video game pads for instance. This is due to the scattered layout of those buttons designated as active for any particular game. However, currently the keyboard is the principle device that works in conjunction with the computer mouse. What is more the computer mouse by nature of it construction cannot provide slower steadier aiming such as that which is possible with a flight yoke/joystick and therefore is limited to quick reflex aiming applications.

Another popular input device is the handheld game pad. These controllers have integrated a number of input components into a single body. They typically contain a digital 8-way directional pad, one or more thumb operated analog joysticks and a plurality of digital and/or analog buttons. The game pad offers excellent finger tip functionality in regard to a plurality of analog and/or digital buttons laid out in a very user friendly and accessible fashion on the surface of a hand held gaming controller. However it lacks the slow steady aiming abilities of the hand operated joysticks, primarily due to the fact that the thumb operated joysticks on a typical game pad are too responsive and lack the control of an entirely hand operated joystick. Moreover, the game pad also lacks the quick reflex aiming ability associated with the mouse because the analog joysticks typically provided are not responsive enough and again fail to use the entire hand of the operator while being used in the gaming environment.

In this regard while all of these input devices have their strengths, in particular applications they also have inherent weaknesses in regard to functionality in certain computer gaming environments and thus are a compromise to the overall skill level possible by the user within the said video gaming environments.

The second area of the limitations inherent to these devices comes as a result of the fact that there are a wide variety of video games on the market. These games range from Role Playing Games, Strategy Games, Flight Simulation Games, Other Simulation-type Games, First and third Person shooting games, Action Games, Adventure Games, Puzzle solving games, etc. These games are played in both two dimensional as well as three dimensional computer generated environments. With such a wide variety of games the difficulty comes in finding a single device or controller system that plays all these games well without compromising associated functionality. In this regard the current input devices lack adaptability.

For instance, a flight yoke controller is typically used to play Flight Simulation video games. This type of controller, while very effective for manipulation within a flight simulation video gaming environment, fails to meet the highest standards of manipulation requirements of, for example, an action/adventure video game or a First Person Shooter video game. Another example would be a standard mouse/keyboard input combination. First Person Shooter video games played on personal computers are typically played with the standard mouse and key board setup. This system, while adequate for first person shooter video games, doesn't represent the best controller solution for flight simulation video games.

As a final example there is the hand held game pad device. These devices, perhaps the most versatile of input gaming devices, still have inherent limitations in there adaptability. They are typically well-adapted to play action/adventure video games. They can even be adapted to play Role Playing Games, First person Shooter Games, even Flight Simulation and other Simulation type games. However they fail to allow the user to play such video games with the highest degree of skill level possible primarily because the components of the hand operated game pad are tailored for general purpose use and not specific applications like the mouse/keyboard or the dedicated flight yoke/joystick. While being the most adaptable of video game controllers hand held game pads also compromise on functionality to a greater or lesser degree.

In this respect all these devices have failed to be completely versatile in terms of adapting to the widest variety of video games on the market or to meet the absolute highest standards as to the degree of skill possible in their use.

Finally in regard to ergonomics these devices fail to meet the variety of needs associated with the video gaming public. Firstly there has been much documentation regarding the stresses and fatigue placed upon computer users who play games with mouse input devices on a regular basis. Carpal tunnel syndrome and related health risks are often symptomatic. Stress to the joints and ligaments and tendons of the shoulder, arm, forearm, hands and wrists are common. As a result there is a definite need for improved ergonomics in relationship to a device which has a computer mousing element. The distance and separation of the mouse from the keyboard is a major part of the problem. The transference of motion back and forth has been determined to be a root cause of the aforementioned problems. A second problem with current mouse functionality is the fact that most mouse devices work on the basis of one handed operation. The load is therefore placed on a single limb. And a final problem with current mouse functionality is the prone posture of the hand. The hand is laid flat, often without appropriate support to the hand, wrist, and limb. As a consequence these members are subjected further to the aforementioned stresses. There have been a number of attempts at improving the ergonomic form function of the mouse but they have not sufficiently addressed all these problems.

Another logistic limitation in all these devices is that their design requires a fixed method of use. For instance, the mouse functions only on a stable flat working surface. The hand operated joystick is also limited to use on a stable flat working surface. At times this may be the preferred method of operation but at other times this method of use may not serve the preferences or needs of the user. The hand held game pad on the other hand is strictly a hand supported device. It works in positions remote from a stable flat working surface. Again this may be the preferred method of use but at other times this may not serve the needs or preferences of the user or the demands of the game being played.

While these limited methods of operation at times improve the overall functionality of the input devices in question, on occasions when such functionality would not be required they limit the options of the user to operate the gaming controller device either on a fixed working surface or in a hand supported position remote from a fixed working surface. There is also an economic limitation to the use of distinct and separate game controllers. The need to have a multitude of input devices to play all existing computer and console video games can become financially burdensome to the consumer. And requiring the game-playing user to change game controllers and readjust and become reacquainted with different controllers diminishes playing skills until the player can act and react without having to think about the controller being used.

BRIEF SUMMARY OF THE INVENTION

It is a general object of the invention to provide a novel and advanced two-hand manipulated peripheral game controlling device along with accompanying systems which solves the above mentioned problems.

A fundamental object of the invention is to provide a hand-operated game pad controller and a plurality of modules that may be releasably joined to the game pad controller to add functionality that is appropriate for the game being played.

A more specific object of the invention is to provide a novel and advanced two-hand operated controller that includes a removable mouse module for axis directional control while at the same time incorporating a game pad device into a single integrated device, thereby eliminating the need for the keyboard in the mouse/keyboard combination.

Another specific object of the invention is to provide a novel and advanced two-hand operated controller that includes a removable base flight yoke/joystick module for axis directional control while at the same time incorporating a game pad module into a single integrated device.

Another specific object of the invention is to provide a novel and advanced two-hand operated controller that includes a removable rotational steering column assembly for axis directional control while at the same time incorporating a game pad module into a single integrated device.

Another specific object of the invention is to provide a novel and advanced two-hand operated controller that easily allows the aforementioned axis directional modules to be alternately attached and/or detached in a docking type arrangement from the game pad module of the device according to the needs and preferences of the user, thereby increasing the adaptability to play a wider variety of computer and/or console video games.

Another specific object of the invention is to provide a novel and advanced two-hand manipulated controller which allows the user's two hands to be unified in the purpose of operating the desired group and/or groups of axis directional controls thereby increasing functionality in a variety of video gaming environment.

Another specific object of the invention is to provide a novel and advanced two-hand manipulated controller which provides a more ergonomic approach to the operation of a mouse element over a fixed working surface as well as a more ergonomic approach to the operation of a joystick/flight stick element over a fixed working surface.

Another specific object of the invention is to provide a novel and advanced two-hand manipulated controller in which the entire hand-held and operated game pad module can be manipulated over a fixed working surface in conjunction with the aforementioned directional modules by means of a rolling wrist support.

Another specific object of the invention is to provide a novel and advanced two-hand manipulated controller in which the entire hand-held and operated game pad module can be manipulated independently from the aforementioned directional modules without engaging a fixed working surface.

In order to achieve the above mentioned objects there is provided according to the present invention novel peripheral input devices which are comprised of:

A hand-held and operated game pad controller, supporting on its top side one digital 8-way directional pad, at least one thumb operated analog joystick, and a plurality of digital and/or analog buttons. On its under side it further houses a plurality of digital and/or analog buttons/triggers. Being hand-held and operated the game pad furthermore has a pair of pistol style gripping members which conforms to the hands of the user to take a substantially upright and more proactive posture. This upright posture is further supported by a pair of flanged and elevated wrist supports, each one positioned at the base of one of the dual pistol style gripping members. These serve as supports to the hands and wrists on their topmost surface. These flanged wrist supports also contain a receptacle for a single ball bearing glide on each of their under sides, the ball bearing portion positioned so as to contact the working surface. This feature facilitates the rolling and manipulation of the device with an attached mouse module over a flat fixed working surface in any given direction. It further facilitates a pivot point from which the user can elevate an attached mouse module and reposition it as desired over the working surface, there by re-centering the mouse module.

The hand operated game pad module furthermore houses a male/female coupling member on the bottom side of the game pad extending substantially perpendicular from the housing. The coupling member is in the form of a pronged plug (male) or a plug receptacle (female). This coupling member facilitates the attachment/detachment of a number of alternate axis directional input devices or accessories.

These removable devices include an optical or conventional ball mouse module comprised of a housing and accompanying electronic axis directional sensor components. A part of the housing has the general shape and dimension of a conventional mouse. Another feature is that the housing contains no button functions as these are provided by the hand-operated game pad. Yet another feature of the mouse housing is a connecting column running substantially vertically between the working surface and the flat bottom surface of the mouse housing. This column has a female/male coupling at its upper end to connect to the male/female coupling member of the game pad. This male/female coupling member is fashioned so as to fit with close tolerance to the male/female coupling member of the hand operated controller. When connected in this manner the added mouse module provides three points of contact with the working plane, made up of the two ball bearing glides found on the rearward wrist supports of the hand operated controller and the forward bottom surface of the mouse module. This connection when in place further allows for two handed manipulation of the mouse sensor while at the same time integrating the complete functional use of the hand operated game pad. These combined modules may simultaneously control an increased plurality of distinct axis of movement inputs at one time, whether linear axis or rotational axis.

Another removable device of the invention is an analog and/or digital Flight yoke/joystick module comprised of a joystick housing and accompanying electronic axis directional sensors and components. A part of the joystick housing forms the base for a substantially vertical joystick column. This base has a general dimensional area on its bottommost side adapted to sit atop a flat fixed working surface and support the joystick and accompanying hand operated controller while in use. This base has a corresponding receptacle which houses the appropriate axis directional electronics and swivel joint. Protruding from this swivel joint is a joy stick column which ascends in a substantially perpendicular fashion from the bottom surface of the base upward. This column has three distinct axis of movements in the corresponding swivel joint. It allows the joystick column to move forward/back and right/left in a variable linear 360 degree motion from the primary pivot point. It furthermore has a right/left twist capability which allows the joystick column to be turned rotationally on its primary axis from the base. These various motions comprise the three directional axis of motion. The joystick column also has a male/female coupling member on it top most portion which facilitates connection to the hand operated game pad controller via its own female/male coupling member. This connection allows for two handed manipulation of the joystick column while at the same time integrating the complete functional use of the hand operated game pad and its plurality of functions. The flight yoke/joystick module is connected in a fashion so as to make a balanced union. These combined modules may simultaneously control an increased plurality of distinct axis movements at one time whether linear axis or rotational axis.

A further removable device of the invention comprises an analog and/or digital steering module comprised of a housing and accompanying electronic axis directional components. An aspect of the steering housing module is that one portion of it forms the base for a horizontal steering column. This base has a general dimensional area on it bottom side, and general weight differential so as to sit atop a flat fixed working surface and support the steering column and accompanying hand operated controller while in use. This base has a corresponding receptacle which houses the appropriate axis directional electronics and steering joint. Protruding from this steering joint is a horizontal steering column which runs substantially parallel to the fixed flat working surface and is furthermore elevated above the surface so as to allow clearance for steering maneuvers. This column has a single axis of motion. It rotates in the steering joint right/left. The steering column furthermore contains a male/female coupling member so as to facilitates connection to the hand operated game pad controller via the female/male coupling member portion of the hand-held and operated game pad. This connection when in place allows for two handed manipulation of the steering column module while at the same time integrating the complete functional use of the hand operated game pad and its plurality of functions. These combined modules allows for simultaneous control of a plurality of distinct axes of movement, both linear axes translation or rotational axes angular excursions.

Additionally these alternative axis input directional devices can be assembled and disassembled from the main body of the controller as is preferred and required by the user and in accordance with the game being played. As such each of these three alternate assembly embodiments of the device forms a novel, distinct, and separate advanced video game controller input device. Together these modules also form a novel and complete advanced video game controller system centered around the two-hand operated controller. The two-hand operated controller can furthermore be used exclusively on its own in a position remote from a flat working surface. These modules therefore constitute a total of four different configurations that may be assembled from the system components, so that the user may adapt the system to meet needs and preferences of the user and to provide the optimal game controller for virtually any game played by the user.

DETAILED DESCRIPTION OF THE INVENTION

The present invention generally comprises a unique two-hand manipulated peripheral game controlling device. A salient feature of the invention is that it provides a game pad controller and a plurality of accessory components, and a connection system for mechanically and electronically connecting any of the accessory components to the game pad to reconfigure the device to best suit the game control requirements of a game to be played.

Figure 1:
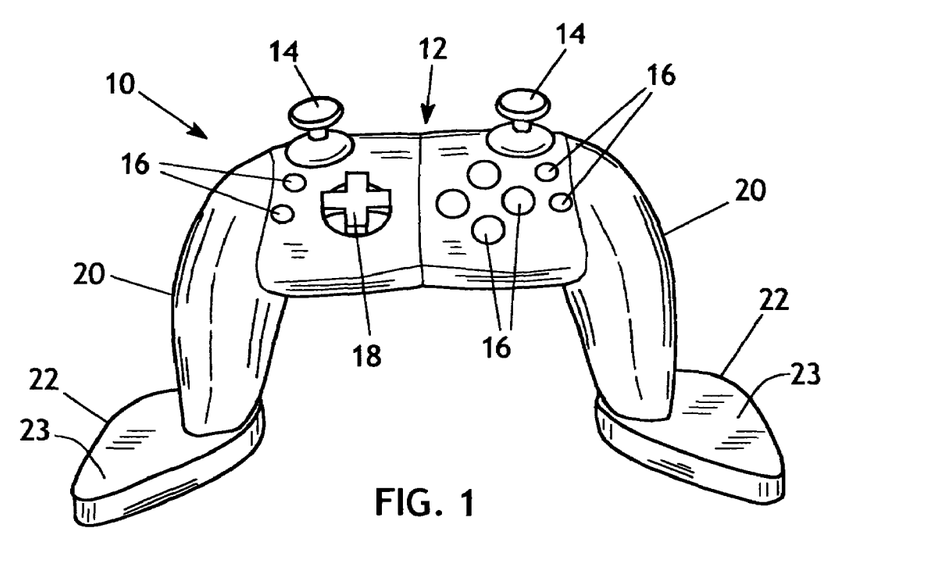
FIG. 1 is a rear perspective view of the hand-held and operated central game pad controller of the present invention.
Figure 2:
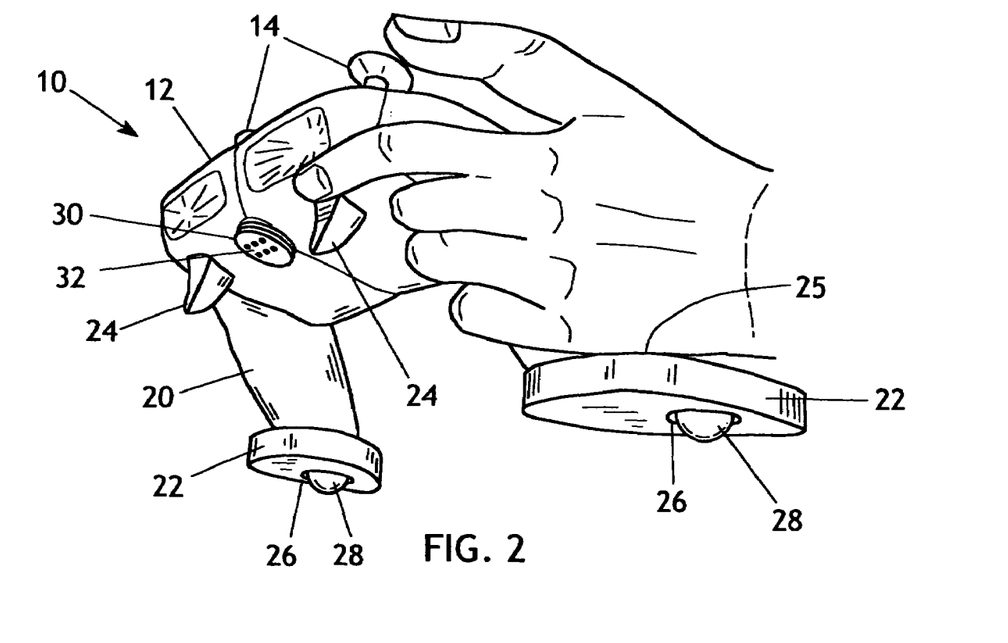
FIG. 2 is a front/bottom perspective view of the hand-held and operated central game pad controller of the present invention.

FIG. 1 and FIG. 2 are perspective views of the central game pad controller 10 according to its proposed embodiment. The peripheral input device 10 comprises a game controller pad body 12 which houses the appropriate electronics and accompanying components (not shown). The game controller body 12 further houses two thumb operated analog sticks 14. The thumb operated analog sticks 14 further contain button press functions which input various data or commands to the computer or video game console and can be programmed accordingly. The game pad controller body 12 also contains a plurality of buttons 16 which also input various data to the computer or video game console and can be programmed according to the preference of the user. Additionally the game control pad body 12 further contains an eight-way digital pad 18.

Figure 3:
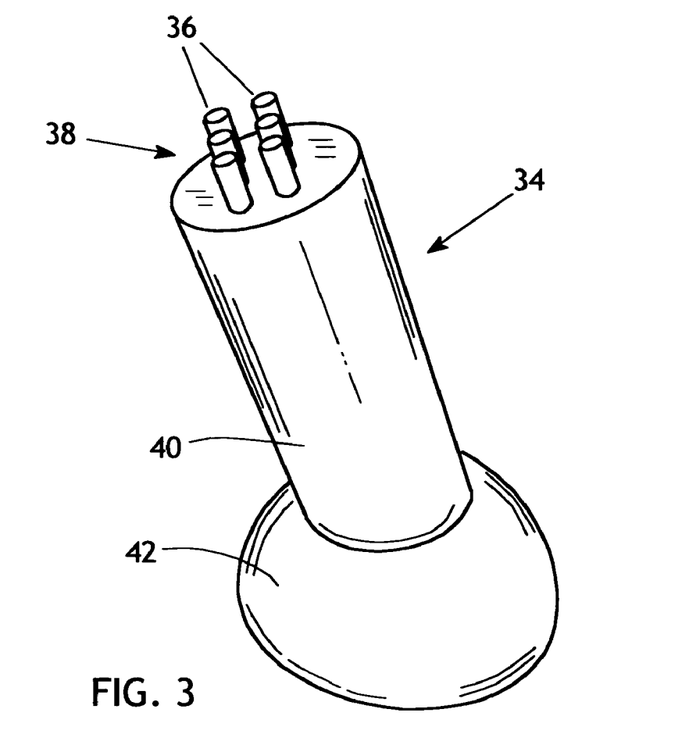
FIG. 3 is a side perspective view of the attachable/detachable mouse module according to its proposed embodiment.
Figure 4:
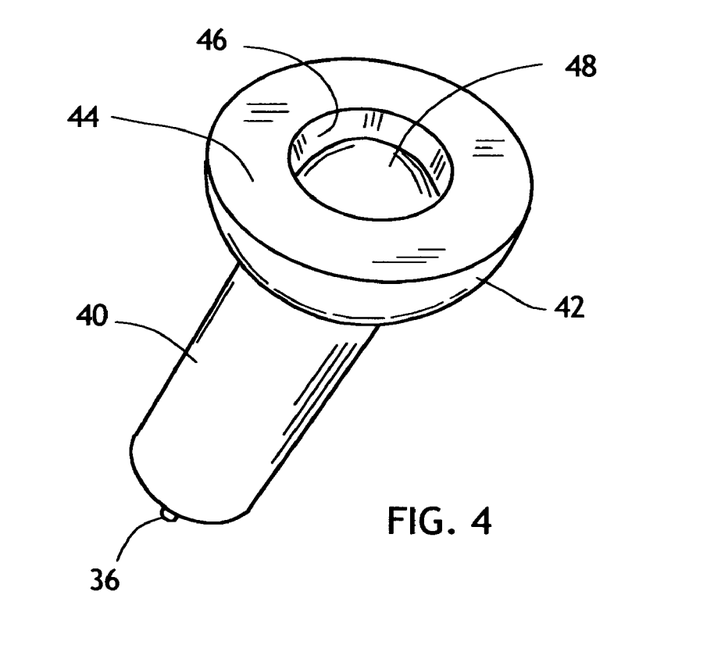
FIG. 4 is a bottom/side perspective view of the attachable/detachable mouse module according to its proposed embodiment.

Extending integrally from laterally opposed ends of the game controller body 12 are two pistol style gripping members 20 which depend from the opposed ends of the body in enantiomorphic relationship. The grips 20 are each curved and dimensioned to be received between the fingers and palm of each respective hand, with the thumbs of each hand extending to interact with the buttons 16, joysticks 14, and the eight-way digital pad 18, as shown in FIG. 2. The grips 20 allow the user to hold or support the hand-held and operated game pad controller 10 in both hands. At the distal depending ends of the gripping members 20 are two plate-like hand and wrist support panels 22 extending laterally and generally in a common plane. The upper surfaces 23 of each panel 22 extend laterally to engage the blade portion 25 of the respective hand gripping the adjacent member 20. These wrist support panels 22 further support a single ball bearing glide 28 (see FIG. 2) placed in a ball bearing receptacle 26 (see FIG. 2) on the bottom portion of each wrist support 22. The glides 28 facilitate rolling of the entire assembly over a flat working surface, for example, such as is needed in the case of an attached mouse module (see FIGS. 3-5).

The underside of the game control pad body 12 further supports two analog trigger assemblies 24 that depend from the bottom surface of the body 12 (see FIG. 2), each trigger being disposed to be engaged by the index finger of the hand gripping the adjacent grip 20. The game control pad body 12 also has a female coupling member 30 (see FIG. 2) molded or fastened into its bottom surface. The female coupling member 30 (see FIG. 2) further includes a plurality of female connecting receptacles 32 (see FIG. 2) which facilitate conductive electronic and mechanical connection to other devices, as will be described with reference to FIGS. 3-9.

It is important to note that the embodiment of the hand-held and operated game pad 10 of FIGS. 1 and 2 can be used as a stand alone unit, and may be used, if desired, without being supported on a fixed, flat, working surface, as shown in FIG. 1 and FIG. 2. The embodiments of the hand held and operated game pad 10 shown herein portray a wireless version of the device. Another embodiment of the hand held and operated game controller 10 may be electronically connected to a computer or gaming console via appropriate cabling (not shown).

As noted above, one of the outstanding features of the invention is that is may be reconfigured and optimized for differing games, game systems, or computer systems. With regard to FIGS. 3 and 4, one accessory component of the invention is a computer mouse module 34 that is releasably securable to the game pad 10 described above. The computer mouse module 34 is comprised of a housing 42 which has a generally hemispherical configuration and contains the appropriate electronics (not shown) for a typical mouse unit. The housing 42 further contains a conventional computer mouse roller 48 (see FIG. 4) with it accompanying receptacle 46 (see FIG. 4). This portion of the device may also be an optical mouse module (not shown). The mouse housing 42 is also has the feature of a flat working surface 44 on its bottom portion to facilitate gliding over the stationary working surface.

Extending diametrically from the mouse housing 42 in a substantially upright manner is a connecting column 40. Atop the connecting column 40 is a male coupling member 38 (see FIG. 3). This male coupling member is comprised of a male connecting plug with multiple prongs 36 which are dimensioned and spaced to be removably inserted into the receptacles 32 of connector 30 to facilitate both electronic and mechanical connectivity to the handheld and operated controller 10 as seen in FIGS. 1 and 2 and thus form a union between the two respective electronic systems of each (not shown).

Figure 5:
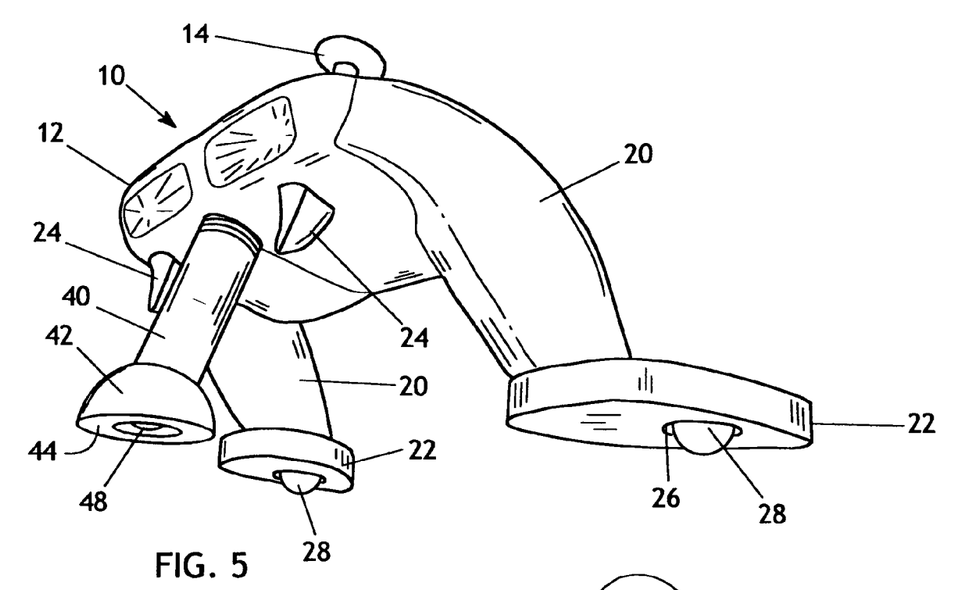
FIG. 5 is a front side perspective view of the hand held and operated peripheral input device and the accompanying attachable/detachable mouse module according to their proposed embodiments.

FIG. 5 is a front perspective view of the computer mouse module 34 electronically and mechanically attached to the hand-held and operated game controller 10. This electro/mechanical coupling is made possible via the female coupling joint 30 and the male coupling member 38 of the mouse module. When in place this union effectively combines the electronic systems of the hand-held and operated game controller 10 and the computer mouse module 30. Note that the bottom surface 44 of the mouse module and the bottom surfaces of the wrist support panels 22 are disposed in approximately the same plane, so that the glides 28 and the mouse ball 48 may glide smoothly on a planar working surface and generate a mouse movement signal. It may be appreciated that in the assembly of FIG. 5 all the functionality of the game controller 10 is available to the user, and added to that capability is the ability to move the assembled unit on a flat surface to input a further directional mouse control signal.

Figure 6:
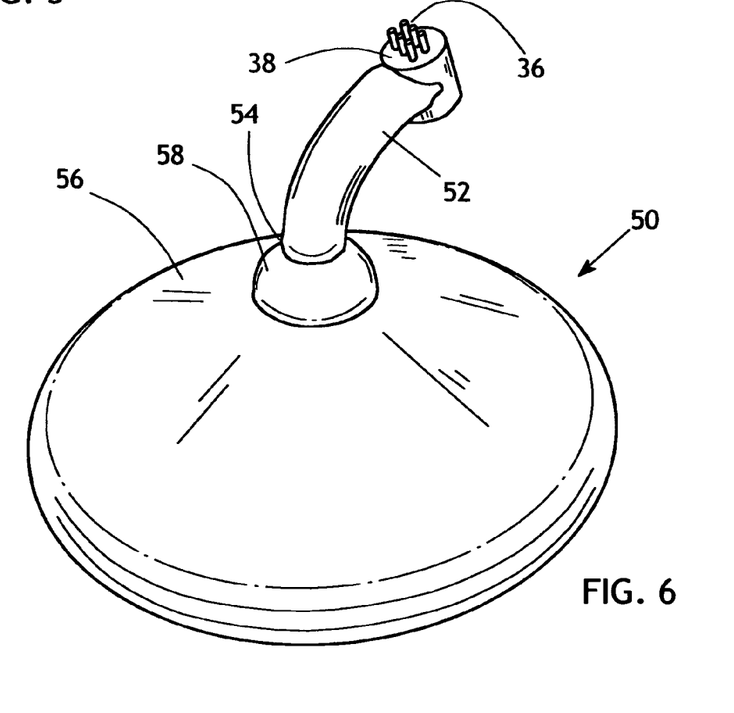
FIG. 6 is a top/rear perspective view of the attachable/detachable joystick module according to its proposed embodiment.

A further accessory for reconfiguring the game controller of the invention is a joystick module 50, as shown in FIG. 6. The joystick component 50 is comprised of a base housing 56 which contains all the appropriate electronic components (not shown). The base housing is shown here as a large disk having a wide stable base and a fairly low vertical dimension, but it may be configured as any convenient shape that provides stability while resting on a horizontal surface. The base housing 56 also contains a receptacle 58 which functionally comprises a socket for a multi-directional swivel joint 54. Extending in a substantially upright manner from the swivel joint member 54 is a connecting column 52, which is a tubular component having a smoothly bending configuration.

Disposed atop the connecting column 52 is a male coupling member 38. This male coupling member is comprised of a male connecting plug with multiple prongs 36 extending obliquely upwardly to facilitate electronic and mechanical connection to the connector 30 of the handheld and operated controller 10 as seen in FIG. 1 and FIG. 2 and thus form a union between the two respective electronic systems of each (not shown). The multi-directional swivel joint 54 allows for three distinct axes of movement. The swivel joint 54 allows the joystick column 52 to move forward/back and right/left in a variable linear 360° motion as it works in conjunction with the receptacle 58 which effectively acts as a fixed pivot point. The swivel joint 54 furthermore has a counter/clockwise twist capability which allows the joystick column to be turned rotationally on its primary axis within the base housing 56 and its accompanying receptacle 58. Movement of the swivel joint as described generates a corresponding joystick signal.

Figure 7:
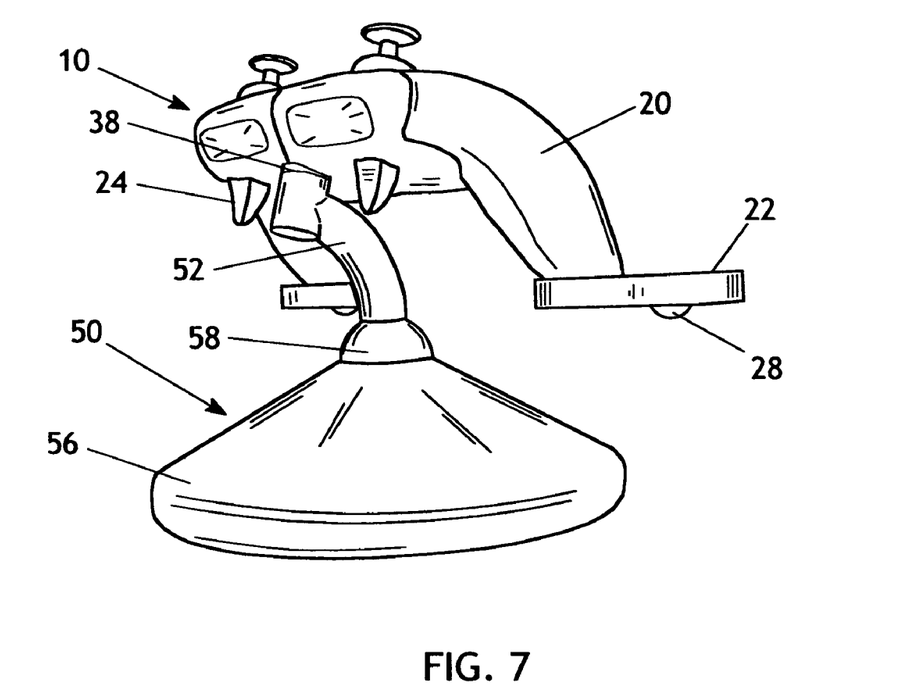
FIG. 7 is a front side perspective view of the hand held and operated peripheral input device and the accompanying attachable/detachable joystick module according to their proposed embodiments.

The joystick module 50 is electronically and mechanically connected to the hand-held and operated game controller 10 as shown in FIG. 7. This electro/mechanical coupling is possible via the female connecting receptacles 32 (see also FIG. 2) engaging the prongs 36 of the male connecting plug (also see FIG. 6). When in place this union effectively combines the electronic systems of each respective module. The game pad controller 10 provides the user with all the functionality described above and, in addition, the joystick signal inputs (forward/back and left/right tilt, and rotation about the primary axis of the base housing 56.

Figure 8:
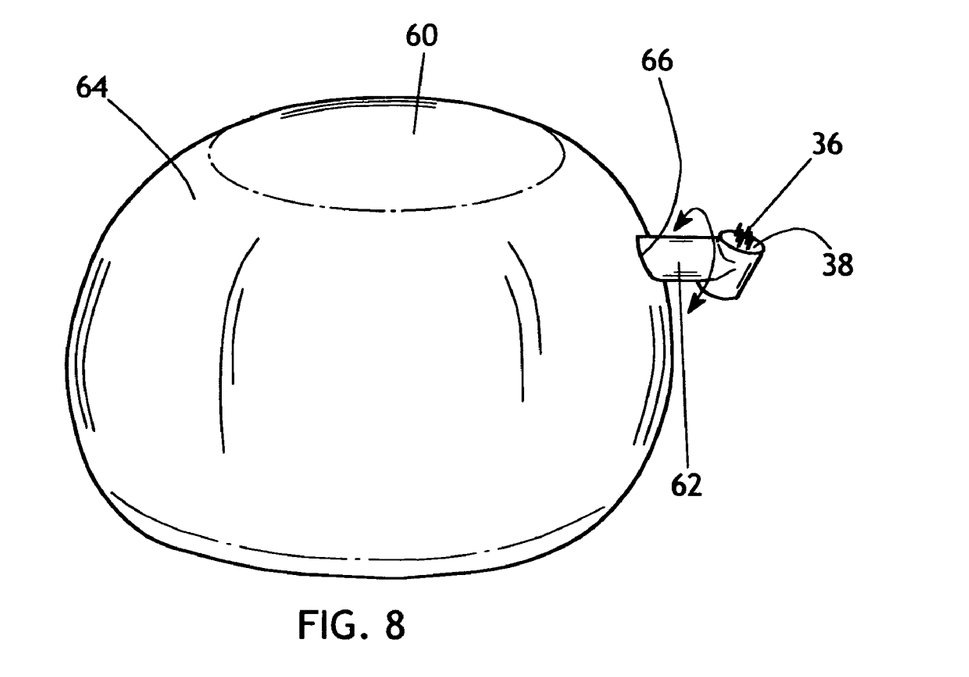
FIG. 8 is a top perspective view of the attachable/detachable steering module according to its proposed embodiment.

With regard to FIG. 8, a further component for reconfiguring the game controller of the invention is a steering assembly 60. The steering assembly 60 is comprised of a base housing 64 which contains all the appropriate electronic components (not shown). The base is shown as an oblate spheroid configuration, but may comprise any shape that provides stability on a supporting surface. The base housing 64 also contains a directional swivel joint 66, and a steering column 62 extends generally horizontally from the joint 66. The directional swivel joint 66 allows a single distinct axis of rotational movement by facilitating the steering column 62 to move rotationally about the longitudinal axis of the steering column 62, and produces a corresponding steering signal output. The column 62 runs substantially parallel to the working surface that supports the base housing 64, and includes at its outer distal end a coupling member 38 extending obliquely upwardly therefrom to facilitate connection to the handheld and operated game controller 10. The male coupling member 38 is comprised of a male connecting plug with multiple prongs 36 which facilitate electronic and mechanical connectivity to the handheld and operated controller 10 as seen in FIG. 1 and FIG. 2 and thus forms a union between the two respective electronic systems of each (not shown).

Figure 9:
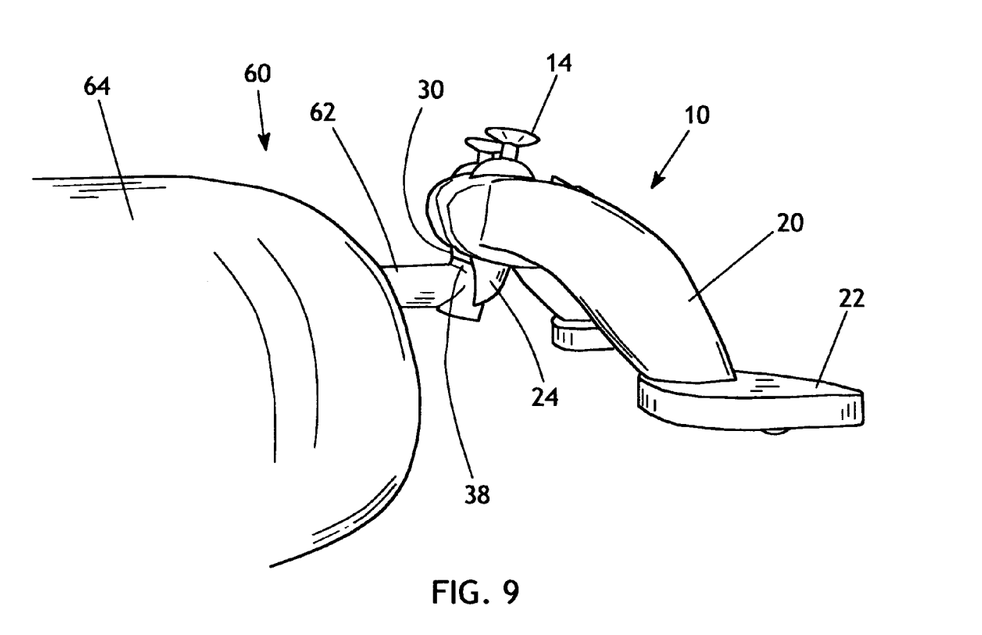
FIG. 9 is a side perspective view of the handheld and operated peripheral input device and the accompanying attachable/detachable steering module according to their proposed embodiments.

With regard to FIG. 9, the steering module 60 is electronically and mechanically attached to the hand-held and operated game controller 10. This electro/mechanical coupling is formed by releasable engagement of the female connecting receptacles 32 (see also FIG. 2) and the prongs of the male connecting plug 36 (see also FIG. 8). This union effectively combines the electronic systems of the hand-held and operated game controller 10 and the steering module 60. As a result, all of the functions of the controller 10 are augmented by the addition of the steering signal output of the swivel joint 66.

Thus the invention provides a game controller assembly that is easily reconfigured to add, remove, and substitute modules that may enhance the functionality of the assembly to optimize the player's participation in the game being played. Each accessory module (mouse, joystick, and steering assemblies) is removable and replaceable through the use of simple plug connectors that enable mechanical support of the game controller 10 and combine the accessory functions with the hand-held game controller functions. The invention thereby provides a comprehensive adaptability to play a wider variety of computer and/or console video games.

The foregoing description of the preferred embodiments of the invention has been presented for purposes of illustration and description. It is not intended to be exhaustive or to limit the invention to the precise form disclosed, and many modifications and variations are possible in light of the above teaching without deviating from the spirit and the scope of the invention. The embodiment described is selected to best explain the principles of the invention and its practical application to thereby enable others skilled in the art to best utilize the invention in various embodiments and with various modifications as suited to the particular purpose contemplated. It is intended that the scope of the invention be defined by the claims appended hereto.

The invention claimed is:

1. A game controller system for electronic games, including:
    a game pad controller having a central housing having first input means for receiving manual user inputs to an electronic game;
    a pair of hand grip members depending in parallel, laterally opposed relationship from laterally opposed ends of said central housing and each hand grip member disposed to engage a respective hand of a user,
    a pair of glide means, each depending from a lower distal end of one of said hand grip members and disposed to engage a flat surface in freely gliding motion;
    a mouse assembly including a lower housing having a bottom surface supporting a mouse movement sensor device;
    said mouse assembly including a column extending upwardly from said lower housing and secured to said central housing, whereby said mouse assembly and the pair of glide means engage a flat surface to support said game controller system in freely gliding fashion.

2. The game controller system of claim 1, further including a pair of hand support members, each extending laterally from a lower distal portion of one of said hand grip members and disposed to support the blade of the user's hand gripping the respective hand grip member.

3. The game pad controller of claim 1, further including a plurality of control buttons extending from said top surface of said central housing and disposed to be engaged by the thumbs of the hands engaging said hand grips.

4. A game pad controller for electronic games, including:
    a central housing having top and bottom surfaces extending laterally;
    a pair of hand grip members depending from laterally opposed ends of said central housing in parallel, laterally spaced fashion, whereby the game pad controller is gripped by both hands of a user;
    a pair of glide means, each depending from a lower distal end of one of said hand grip members and disposed to engage a flat surface in freely gliding motion;
    a pair of hand support members, each extending laterally from a lower distal portion of one of said hand grip members and disposed to engage the blade of the user's hand gripping the respective hand grip member;

whereby the user's hands may be supported through the hand support members by the pair of glide means on a flat surface, further including a mouse assembly having a lower housing supporting a mouse device, a column extending upwardly from said lower housing to said bottom surface of said central housing, so that said mouse assembly depends from said bottom surface of said game pad controller and comprises with said pair of glide members a three-point engagement of a flat surface in freely gliding motion.

* * * * *